US010796367B1

(12) United States Patent
Yarbrough et al.

(10) Patent No.: US 10,796,367 B1
(45) Date of Patent: Oct. 6, 2020

(54) COMPUTER SYSTEM AND USER INTERFACE FOR RETIREMENT PLANNING

(71) Applicant: Wells Fargo Bank, N.A., San Francisco, CA (US)

(72) Inventors: Chad Allen Yarbrough, St. Louis, MO (US); Christopher J. Healey, Charlotte, NC (US); Jeff Timmermann, St. Louis, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1320 days.

(21) Appl. No.: 14/863,697

(22) Filed: Sep. 24, 2015

Related U.S. Application Data

(60) Provisional application No. 62/055,060, filed on Sep. 25, 2014.

(51) Int. Cl.
*G06Q 40/00* (2012.01)
*G06Q 40/06* (2012.01)

(52) U.S. Cl.
CPC .................... *G06Q 40/06* (2013.01)

(58) Field of Classification Search
USPC .......... 705/39, 37, 40, 41, 36; 707/780, 766, 707/760, 767, 758; 704/215; 709/201; 235/383, 379, 380
See application file for complete search history.

(56) References Cited

U.S. PATENT DOCUMENTS

| | | | |
|---|---|---|---|
| 6,697,824 B1* | 2/2004 | Bowman-Amuah | G06F 16/958 709/229 |
| 7,921,048 B2* | 4/2011 | Sloan | G06Q 40/02 705/36 R |
| 8,036,984 B2* | 10/2011 | Elterich | G06Q 20/10 705/35 |
| 8,326,728 B1* | 12/2012 | Devaney | G06Q 40/08 705/35 |
| 8,639,622 B1* | 1/2014 | Moore | G06Q 20/405 705/43 |
| 10,210,583 B2* | 2/2019 | Colquitt | G06Q 40/12 |
| 10,636,087 B1* | 4/2020 | Bardouille | G06F 16/9558 |
| 2002/0198806 A1* | 12/2002 | Blagg | G06Q 40/02 705/35 |
| 2003/0097331 A1* | 5/2003 | Cohen | G06Q 20/10 705/39 |
| 2005/0240526 A1* | 10/2005 | Hill | G06Q 20/14 705/40 |
| 2006/0247987 A1* | 11/2006 | Busch | G06Q 40/12 705/30 |
| 2010/0100469 A1* | 4/2010 | Buchanan | G06Q 10/06 705/35 |

OTHER PUBLICATIONS

Computer Usages in Financial Corporate Planning; Osborne, Homer C.; Symposium on Petroleum Economics and Evaluation, Mar. 3-5, Dallas, Texas; Apr. 4, 2013. (Year: 2013).*

(Continued)

*Primary Examiner* — Tien C Nguyen
(74) *Attorney, Agent, or Firm* — Schwegman Lundberg & Woessner, P.A.

(57) ABSTRACT

A computer-implemented method and an interactive computer system has a user interface with computer software application tool(s) for retirement planning purposes. The user interface is generally referred to herein as an income dashboard.

16 Claims, 33 Drawing Sheets

(56) References Cited

OTHER PUBLICATIONS

Long-Run Savings and Investment Strategy Optimization; Gerrard, Russell, Guillén, Montserrat, Nielsen, Jens Perch, Pérez-Marin, Ana M.; The Scientific World Journal, 2014, 510531; Feb. 23, 2014. (Year: 2014).*

* cited by examiner

| CLIENT INFORMATION | | | IMPORTANT DATES |
|---|---|---|---|
| | AGE | RETIREMENT AGE | FILING STATE |
| BARBARA | 66 | RET | IA |
| SCOTT | 62 | RET | IA |
| CURRENT PLAN INVESTMENT ASSETS: $1,123,276.92 | | | |
| CURRENT EFFECTIVE TAX RATES: 16.27% | | | |
| CURRENT WITHDRAWAL RATE: 4.59% | | | |

| SELECT A VIEW: | POSSIBLE ADJUSTMENTS | MODIFIED |
|---|---|---|
| ● CURRENT YEAR VIEW | OVERRIDE EFFECTIVE TAX RATE | NO |
| ○ RETIREMENT YEAR VIEW | OVERRIDE ADVANCED ASSUMPTIONS | YES |
| ○ 5-YEAR VIEW | | |

*FIG. 4B*

SELECT A VIEW:

- ● CURRENT YEAR VIEW

- ○ RETIREMENT YEAR VIEW

- ○ 5-YEAR VIEW

| ⊟ TOTAL SPENDING GOAL | |
|---|---|
| RETIREMENT SPENDING * | (RET - END) |
| FAMILY VACATION - BARBARA * | (RET - 97) |
| ESTIMATED TAXES DUE | |
| ⊟ INCOME SOURCES | |
| SOCIAL SECURITY - SCOTT | (62 - 93) |
| SOCIAL SECURITY - BARBARA | (65 - 95) |
| STEVE'S IPERS - SCOTT | (62 - 93) |

*FIG. 10B*

| ⊟ INVESTMENT INTEREST/DIVIDENDS | | | GROSS TOTAL* $7,119 |
|---|---|---|---|
| ⊟ TAXABLE ACCOUNTS | | | $2,344 |
| ⊟ ACCOUNT STANDARD BROKERAGE | | | $0 |
| ⊟ ACCOUNT | | | $2,344 |
| NAME | QUANTITY | MARKET VALUE | |
| AMER BALANCED FD CL A | 500.00 | $11,960.00 | $143 |
| BOND FUND OF AMERICA A | 1,000.00 | $12,530.00 | $221 |
| CASH ALTERNATIVE | 0.01 | $0.01 | $0 |
| COCA COLA COMPANY | 200.00 | $8,028.00 | $168 |
| KIMBERLY-CLARK CORP | 100.00 | $10,788.00 | $243 |
| LIBERTY ALL-STAR EQUITY | 1,000.00 | $5,710.00 | $300 |
| MCDONALDS CORP | 200.00 | $19,596.00 | $486 |
| PROCTER & GAMBLE CO | 200.00 | $16,868.00 | $361 |
| WASH MUTL INVS FD INC A | 800.00 | $31,448.00 | $423 |

YEAR 1: ACTUAL YIELDS

YEAR 2-5: USES YIELD ASSUMPTIONS TO CALCULATE INCOME

*FIG. 12*

| INCOME DASHBOARD SUMMARY | |
|---|---|
| TOTAL INCOME | $81,348 |
| -TOTAL SPENDING GOAL | $125,769 |
| =TOTAL DIFFERENCE | $-44,421 |
| COVERAGE RATIO | 64.68% |
| ESSENTIAL SPENDING NEED | $90,000 |
| ESSENTIAL COVERAGE RATIO | 90.39% |

FIG. 13B

| | |
|---|---|
| POSSIBLE ADJUSTMENTS | MODIFIED |
| OVERRIDE EFFECTIVE TAX RATE | NO |
| OVERRIDE ADVANCED ASSUMPTIONS | YES |

*FIG. 14B*

| Client Income Dashboard | | | | | ☒ |
|---|---|---|---|---|---|
| Override Advanced Assumptions | | | | | |

This feature allows you to modify various rates and yield values and include or exclude income from Tax Deferred and Tax Exempt accounts within your Income Dashboard/Reports.
Note: Changes made below will modify every year in Income Dashboard.

⊟Yield Selections ⦿Use Defaults ○Use Plan Overrides

| | Current Yield | Default Rate | Plan Override | Allowable Range |
|---|---|---|---|---|
| Growth of Dividend Income | N/A | 4.50% | ☐% | 0.00 - 6.00% |
| Income Dashboard CMA Yield: | | | | |
|   Equity | 2.09% | 2.10% | ☐% | 0.00 - 4.50% |
|   Fixed Income | 2.20% | 2.50% | ☐% | 0.00 - 5.00% |
|   Fixed Income (Tax Exempt) | 0.00% | 2.50% | ☐% | 0.00 - 5.00% |
|   Multi-Class | 1.19% | 2.08% | ☐% | 0.00 - 4.50% |
|   Alternative Investment | 0.00% | 0.00% | ☐% | 0.00 - 2.00% |
|   Cash Alternative | 0.00% | 015% | ☐% | 0.00 - 0.25% |
|   Other | 0.00% | 0.00% | ☐% | 0.00 - 2.00% |

⊟Tax Deferred Accounts - Income Selections

| Include Income | | Acct# | Name | Owner | Reg Type | Product Type | Market Value (as of 03/02/2012) |
|---|---|---|---|---|---|---|---|
| S | ☑ | 401K | Scott | Scott | | External Account | $427,800.00 |
| S | ☑ | 11113333 | Barbara | Barbara | IRA/K Out | Traditional IRA | $55,546.18 |

[Select All] [Clear All]

⊟Tax Exempt Accounts - Income Selections

| Include Income | | Acct# | Name | Owner | Reg Type | Product Type | Market Value (as of 03/02/2012) |
|---|---|---|---|---|---|---|---|
| S | ☑ | 11112222 | Barbara | Barbara | IRA/K Out | Roth IRA | $23,002.73 |

[Select All] [Clear All]

Essential Spending Illustration

Illustrate Essential Spending Need? ☑

The Total Spending Goal is $125,769. How much of the Total Spending Goal do you want to allocate towards the client's Essential Spending Need? Essential Spending will be illustrated in the Income Summary and on client reports.

Essential Spending Need: $ 90,000

[OK] [Cancel]

FIG. 15A

| ⊟TAX DEFERRED ACCOUNTS - INCOME SELECTIONS | | | | | |
|---|---|---|---|---|---|
| INCLUDE ⓘ INCOME | ACCT# | NAME | OWNER | REG TYPE | PRODUCT TYPE | MARKET VALUE (AS OF 03/02/2012) |
| ☑ | 401K | SCOTT | SCOTT | | EXTERNAL ACCOUNT | $427,800.00 ⊙ |
| ☑ | 11113333 | BARBARA | BARBARA | IRA/K OUT | TRADITIONAL IRA | $55,546.18 ⊙ |

[SELECT ALL] [CLEAR ALL]

| ⊟TAX EXEMPT ACCOUNTS - INCOME SELECTIONS | | | | | |
|---|---|---|---|---|---|
| INCLUDE ⓘ INCOME | ACCT# | NAME | OWNER | REG TYPE | PRODUCT TYPE | MARKET VALUE (AS OF 03/02/2012) |
| ☑ | 11112222 | BARBARA | BARBARA | IRA/K OUT | ROTH IRA | $23,002.73 ⊙ |

[SELECT ALL] [CLEAR ALL]

FIG. 15B

ESSENTIAL SPENDING ILLUSTRATION

ILLUSTRATE ESSENTIAL SPENDING NEED? ☑

THE TOTAL SPENDING GOAL IS $125,769. HOW MUCH OF THE TOTAL SPENDING GOAL DO YOU WANT TO ALLOCATE TOWARDS THE CLIENT'S ESSENTIAL SPENDING NEED? ESSENTIAL SPENDING WILL BE ILLUSTRATED IN THE INCOME SUMMARY AND ON CLIENT REPORTS.

ESSENTIAL SPENDING NEED: $ 90,000

*FIG. 15C*

| CLIENT | | | | |
|---|---|---|---|---|
| OVERRIDE EFFECTIVE TAX RATE | | | | |

THE INCOME DASHBOARD USES A CALCULATED EFFECTIVE TAX RATE BY DEFAULT.

DO YOU WISH TO MAKE ANY CHANGES?

| | DEFAULT EFFECTIVE TAX RATE | OVERRIDE % FEDERAL TAX RATE | STATE TAX RATE | OVERRIDE $ TOTAL ESTIMATED TAXES DUE |
|---|---|---|---|---|
| CURRENT YEAR | ⦿ 16.27% | ○ 0.00% | 8.98% | ○ $ 0 |
| YEAR 2 | ⦿ 16.47% | ○ 0.00% | 8.98% | ○ $ 0 |
| YEAR 3 | ⦿ 16.65% | ○ 0.00% | 8.98% | ○ $ 0 |
| YEAR 4 | ⦿ 16.82% | ○ 0.00% | 8.98% | ○ $ 0 |
| YEAR 5 | ⦿ 16.99% | | 8.98% | ○ $ 0 |

SAVE CHANGES    CANCEL

CHANGES SAVED WILL ALWAYS BE RETAINED IN THE INCOME DASHBOARD

*FIG. 16*

RETIREMENT INCOME
_____

TABLE OF CONTENTS

COVER PAGE                                                   1
    CURRENT YEAR VIEW : SUMMARY         3
    CURRENT YEAR VIEW : DETAIL           4
    RETIREMENT YEAR VIEW : SUMMARY     6
    RETIREMENT YEAR VIEW : DETAIL       7
    5 - YEAR VIEW : SUMMARY                 8
    5 - YEAR VIEW : DETAIL                   9
    DISCLOSURES                                     10

FIG. 17

RETIREMENT INCOME

CURRENT YEAR VIEW : DETAIL

| CURRENT YEAR VIEW | (AGE 60/53) |
|---|---|
| TOTAL SPENDING GOAL (GROSS) | $17,597 |
|     RETIREMENT SPENDING (AGE 62 - END) | N/A |
|     ESTIMATED TAXES DUE | $17,597 |
| INCOME SOURCES (GROSS) | $0 |
| INVESTMENT INTEREST/DIVIDENDS (GROSS) | $14,659 |
|     TAXABLE ACCOUNTS | $14,659 |
|       ACCOUNT - XXXX9614 - JANET | $14,659 |
|         CASH ALTERNATIVE BALANCE | $0 |
|         ARTISAN FDS MID CAP VALU | $95 |
|         CALAMOS GRWTH&INCM CL I | $531 |
|         FIRST EGLE SGEN OVRS -I | $1,334 |
|         FRANKLN T/F FED INTR ADV | $2,545 |
|         GS FINL SQ TREAS INSTL | $0 |
|         IVY ASSET STRATEGY CL I | $2,134 |
|         JANUS SM CAP VAL FD CL I | $235 |
|         JP MRGN US L/C CORE PLS | $365 |
|         MFS VALUE FD CL I | $1,065 |
|         NUVEEN HGH YLD MUNI BD-1 | $1,844 |
|         OPPNHEIMER DEV MKTS CL Y | $271 |
|         PRINCPL REAL EST SECS FD | $1,066 |
|         PRUDNTL JENN M/C GRWTH Z | $58 |
|         ROYCE PREMIER FUND CL W | $81 |
|         RS GLB NAT RES FND CL Y | $36 |
|         SATUIT US EMRG COS FDS | $0 |
|         SECURITY GUGG MID CAP A | $0 |
|         TEMPLETON INC GLB BD ADV | $2,524 |
|         THORNBURG LTD TRM MUNI-I | $475 |
|       ACCOUNT - XXXX3255 - JANET | $0 |
|         CASH ALTERNATIVE BALANCE | $0 |
|         OMNICOM GROUP | $0 |
|         WALGREEN COMPANY | $0 |
|         WELLS FARGO 0% 020516 | $0 |
|         WELLS FARGO 0% 05/07/13 | $0 |
|         WELLS FARGO 0% 08/05/16 | $0 |
|       ACCOUNT - XXXX3425 - JANET-ANNUITY | |
|         CASH ALTERNATIVE BALANCE | $0 |
|         PACIFIC LIFE VALUES | $0 |

FIG. 19

RETIREMENT INCOME

ACCOUNT - XXXX7413 - JANET
CASH ALTERNATIVE BALANCE                    $0
                                             $0

*THE TOTAL VALUE OF INCOME SOURCES ARE BASED ON THE GROSS VALUE OF THE INCOME SOURCES AND MAY NOT TOTAL THE SUM OF EACH OF THE INDIVIDUAL INCOME SOURCES. THE VALUE OF EACH INDIVIDUAL INCOME SOURCE MAY BE DISPLAYED AS EITHER THE GROSS OR NET VALUE.

FIG. 20

RETIREMENT INCOME

RETIREMENT YEAR VIEW : DETAIL

| CURRENT YEAR VIEW | (AGE 62/55) |
|---|---|
| TOTAL SPENDING GOAL (GROSS) | $69,553 |
| RETIREMENT SPENDING (AGE 62 - END) | $58,350 |
| VACATIONS - ROBERT (AGE RET - END) | $5,600 |
| ESTIMATED TAXES DUE | $5,603 |
| INCOME SOURCES (GROSS) | $42,347 |
| SOCIAL SECURITY - ROBERT (AGE 62 - DEATH) | $14,346 |
| PENSION - ROBERT (AGE RET - 80) | $28,001 |
| INVESTMENT INTEREST/DIVIDENDS (GROSS) | $15,082 |
| TAXABLE ACCOUNTS | $15,082 |
| MULTI-CLASS | $2,661 |
| EQUITY | $4,989 |
| FIXED INCOME | $7,396 |
| CASH ALTERNATIVE | $0 |
| ALTERNATIVE INVESTMENT | $36 |

*THE TOTAL VALUE OF INCOME SOURCES ARE BASED ON THE GROSS VALUE OF THE INCOME SOURCES AND MAY NOT TOTAL THE SUM OF EACH OF THE INDIVIDUAL INCOME SOURCES. THE VALUE OF EACH INDIVIDUAL INCOME SOURCE MAY BE DISPLAYED AS EITHER THE GROSS OR NET VALUE.

FIG. 22

RETIREMENT INCOME

5 - YEAR VIEW : DETAIL

| CURRENT YEAR VIEW | (AGE 60/53) | (AGE 61/54) | (AGE 62/55) | (AGE 63/56) | (AGE 64/57) |
|---|---|---|---|---|---|
| TOTAL SPENDING GOAL (GROSS) | $17,597 | $17,194 | $69,553 | $71,759 | $74,034 |
| RETIREMENT SPENDING (AGE 62 - END) | N/A | N/A | $58,350 | $60,100 | $61,903 |
| VACATIONS - ROBERT (AGE RET - END) | N/A | N/A | $5,600 | $5,769 | $5,942 |
| ESTIMATED TAXES DUE | $17,597 | $17,194 | $5,603 | $5,890 | $6,189 |
| INCOME SOURCES (GROSS) | $0 | $0 | $42,347 | $43,617 | $44,927 |
| SOCIAL SECURITY - ROBERT (AGE 62 - DEATH) | N/A | N/A | $14,346 | $14,776 | $15,220 |
| PENSION - ROBERT (AGE RET-80) | N/A | N/A | $28,001 | $28,841 | $29,707 |
| INVESTMENT INTEREST/DIVIDENDS (GROSS) | $14,659 | $14,867 | $15,082 | $15,306 | $15,541 |
| TAXABLE ACCOUNTS | $14,659 | $14,867 | $15,082 | $15,306 | $15,541 |
| MULTI-CLASS | $2,665 | $2,661 | $2,661 | $2,661 | $2,661 |
| EQUITY | $4,570 | $4,774 | $4,989 | $5,213 | $5,448 |
| FIXED INCOME | $7,388 | $7,396 | $7,396 | $7,396 | $7,396 |
| CASH ALTERNATIVE | $0 | $0 | $0 | $0 | $0 |
| ALTERNATIVE INVESTMENT | $36 | $36 | $36 | $36 | $36 |

CASH FLOWS FOR YEARS 2 THROUGH 5 ARE ESTIMATED BASED ON YIELD ASSUMPTIONS FOR EACH ASSET CLASS. ADDITIONALLY, INVESTMENT INTEREST AND DIVIDENDS ARE GROUPED AT A SUMMARY-LEVEL IN THE 5-YEAR VIEW AS THEY ARE SOLELY ESTIMATES.

*THE TOTAL VALUE OF INCOME SOURCES ARE BASED ON THE GROSS VALUE OF THE INCOME SOURCES AND MAY NOT TOTAL THE SUM OF EACH OF THE INDIVIDUAL INCOME SOURCES. THE VALUE OF EACH INDIVIDUAL INCOME SOURCE MAY BE DISPLAYED AS EITHER THE GROSS OR NET VALUE.

FIG. 24

COMPUTER SYSTEM AND USER INTERFACE FOR RETIREMENT PLANNING

CROSS-REFERENCE TO RELATED APPLICATIONS

This application claims priority from U.S. patent application Ser. No. 62/055,060, filed on Sep. 25, 2014, in the United States Patent and Trademark Office. The disclosure of which is incorporated herein by reference in its entirety.

FIELD OF THE INVENTION

The present invention generally relates to a computer system and computer-implemented method for use in retirement income planning, more particularly to an interactive computer system having a retirement income planning user interface with computer software application tools.

BACKGROUND OF THE INVENTION

As people born between the years 1946 and 1964, referred to as the "baby boomers," enter into retirement, they are increasingly doing so without the benefit of a pension. Today only 10% of private companies provide employees with a pension when they retire causing retirees to rely upon their 401(k) savings to help generate income during retirement. Thus, there is an increased emphasis on retirement planning.

There are shortcomings associated with existing methods of retirement planning. Among such shortcomings include that the solutions are not up to date with current technological needs, and that the solutions are static and only provide one-way information sharing. Methods used for long-term retirement planning do not address short-term needs or provide short-term solutions. Thus, there is a need for an automated computer system and method that can take into account long term retirement planning but also addresses short-term planning and needs.

SUMMARY OF THE INVENTION

The present invention relates to a computer-implemented method and an interactive computer system having a user interface with computer software application tool(s) for retirement planning purposes. The user interface is generally referred to herein as an income dashboard. The income dashboard captures user input, is interactive, provides feedback, and can be a mode of communication with a financial advisor. The income dashboard also shows progress toward a future goal and can show impact of current actions on future results.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 4B is an enlarged view of the "Client Information" section of FIG. 4A.

FIG. 5B is an enlarged view of the "Select a View" section of FIG. 5A.

FIG. 8 illustrates a "5-Year" view section of the income dashboard.

FIG. 10B is an enlarged view of the section of FIG. 10A.

FIG. 12 illustrates a "Taxable Accounts" section of the "Investment Interest/Dividends" section of the income dashboard. This section includes the actual investment account holdings and actual estimated income from those holdings.

FIG. 13B is an enlarged view of the "Income Dashboard Summary" of FIG. 13A.

FIG. 14B is an enlarged view of the "Possible Adjustments" section of FIG. 14A.

FIG. 15A illustrates a screenshot of an "Override Advanced Assumptions" section of the income dashboard.

FIG. 15B illustrates a "Tax Deferred Accounts-Income Selections" section for tax deferred accounts and a "Tax Exempt Accounts-Income Selections" section for tax exempt accounts of the income dashboard.

FIG. 15C illustrates an "Essential Spending Illustration" section of the income dashboard.

FIG. 16 illustrates an "Override Effective Tax Rate" section of the income dashboard.

FIGS. 17-24 illustrate a sample report generated by the computer system of the present invention using the income dashboard.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1:
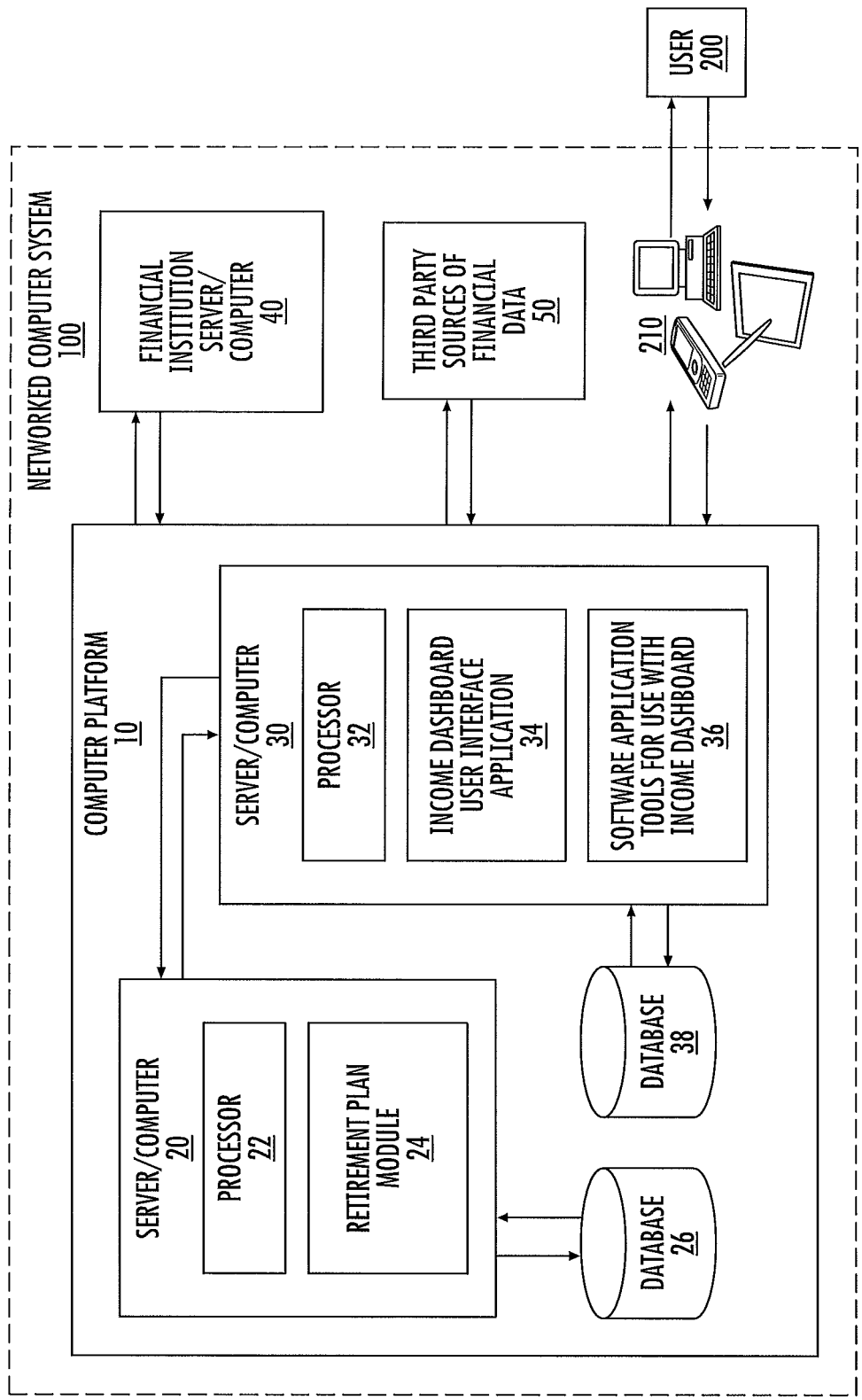
FIG. 1 illustrates a computer platform designed for use with the user interface and computer software application tools of the present invention.

Referring to the figures, FIG. 1 illustrates a computer platform specially built for use with the user interface and computer software application tool(s) of the present invention. As shown in FIG. 1, a computer platform 10 operates in a networked computer system 100. The computer platform 10 is specially designed for use with an income dashboard user interface application 34 and computer software application tool(s) 36 in accordance with the present invention. As shown in FIG. 1, server/computer 30 comprises a processor 32, income dashboard user interface application 34, and software application tool(s) 36. The server/computer 30 can also store and access data and other information in a database 38. The computer platform 10 comprises computer hardware and software including server/computer 20 having one or more retirement plan modules 24 and a processor 22 capable of running such module(s) 24. The server/computer 20 can store and access data and other information in a database 26. The server/computer 20 and the server/computer 30 are communicatively connected with each other. The computer platform 10 is designed to present a customized user interface as shown in FIGS. 2-16 on a device 210 of a user 200. The user 200 may access the income dashboard user interface application 34 with a computer-based device 210 such as a computer, tablet, mobile phone or other computer-based device. The income dashboard user interface relies upon the computer platform 10 to present the user with an interactive, side-by-side display of data from a retirement plan via the retirement plan module 24. The data presented may be used to optimize a portfolio, for example, using the computer software application tools 36 of the present invention. The computer platform 10, as shown, is communicatively connected to one or more financial institution server/computers 40. The computer platform 10 may also be communicatively connected to one or more third party sources 50 of financial data.

The user interface is presented in a display form referred to herein as an income dashboard. The income dashboard is used to address how an investment portfolio can meet retirement income needs of a user and whether a user will need to access principal during retirement. The "user" generally refers to a client of a financial advisor or of a financial institution but may include, but is not limited to, a financial institution representative, a third-party advisor or other third-party acting on behalf of a client, for example. From the user's perspective, the income dashboard answers the question: "Where will my retirement come from?" The income dashboard is interactive and provides a number of options for viewing an overall financial situation of a user.

As shown in FIG. 1, the income dashboard is accessible by a user 200 on a computer-based device 210 such as a desktop or laptop, a mobile device such as a mobile phone or a tablet, among other devices. The income dashboard which is displayed on a display screen of the device 210 has a number of interactive areas that work together to provide a dynamic view of the current account and financial health of the user 200. For example, there may be a section or tab that is accessible with a mobile device that shows a customized on-track or off-track financial health view. There may also be multiple views such as current view, retirement view and future view.

The income dashboard when used on a computer-based device, for example, can include the instant ability also to have the user display and glance at his/her progress toward a financial health goal (for retirement or otherwise). Taking certain immediate choices, for example, can be incorporated into a financial picture. The income dashboard may show a current view of financial health but can also have other features that may be more complex or work with one or more other financial health products and retirement products to incorporate future views.

A feature of the income dashboard is the ability to present a side by side view of a number of features. One such side by side view can include a current financial situation versus a proposed future action. The future action can be designed to show the user how the impact of a certain action is going to impact retirement years, for example. In this manner the impact of short term tactical moves can be displayed on future conditions. Other features that can be included and displayed may be currency support (i.e. more than one currency), optimal dividend stock picks and even estimate values of savings (currently or future picking options). The income dashboard can also have areas or sections where certain actions can be enabled such as purchase of annuities, for example.

A core function of the income dashboard is that it takes retirement goals of a user and measures the ability of a user to fund those goals based upon actual income an investment/retirement is generating. The income dashboard utilizes the functionality and design of the special computer platform in order to incorporate known investments internally and assets held externally including, for example, any additional investments disclosed or made available through data aggregation services. This unique view of investment income overlaid with a stated retirement plan is unique as it provides the ability of a user not just to focus on general return assumptions, irrespective of actual security holding, over a longer time period.

Figure 2:
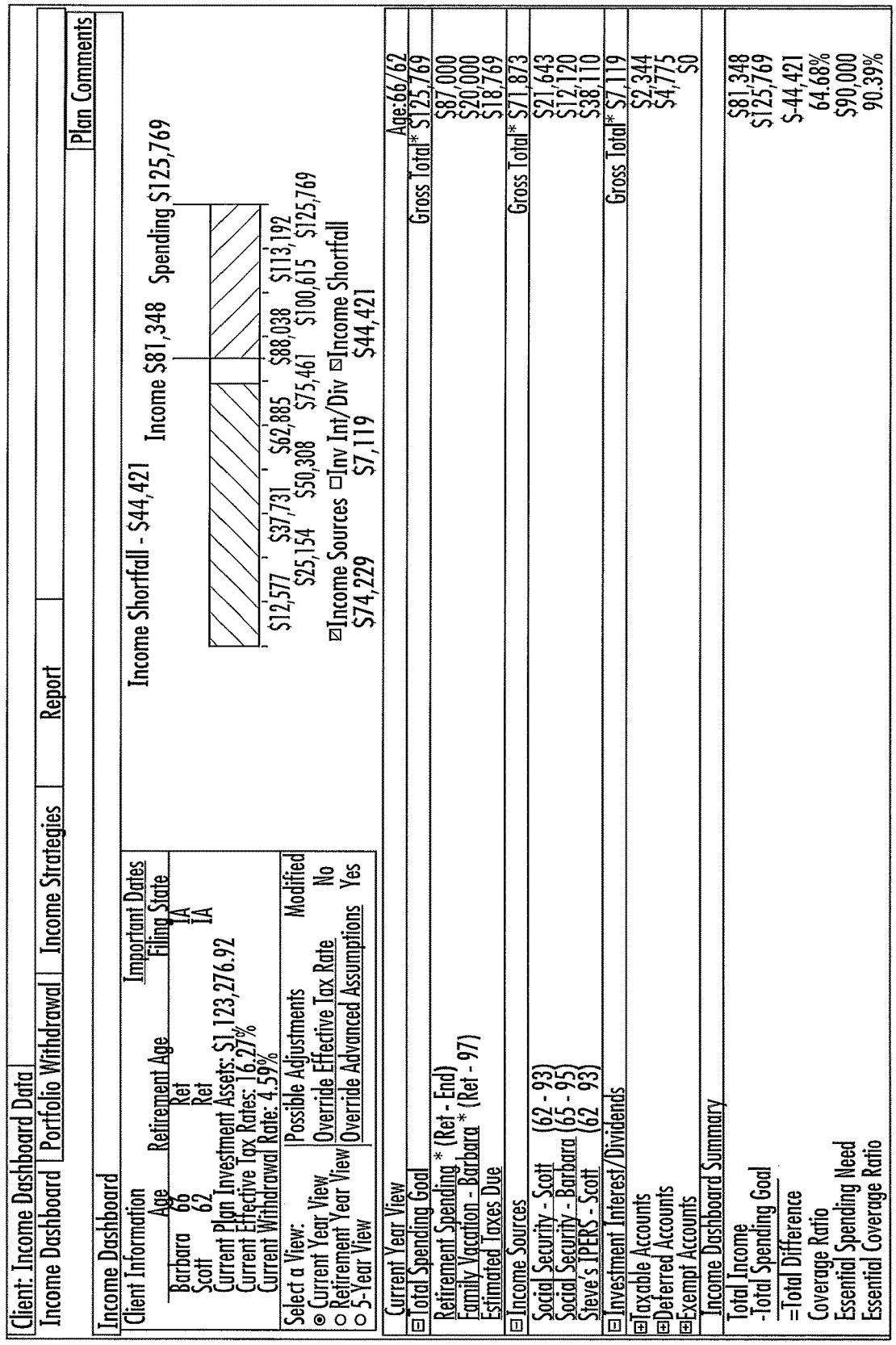
FIG. 2 illustrates a landing page of the income dashboard.

FIG. 2 illustrates a landing page of the income dashboard. The landing page may be accessed with the computer-based device of the user. The income dashboard displays a detailed view of a user's retirement income. This is used to help a user understand where his/her income will come from during retirement. The income dashboard accesses data from a retirement plan of a user and any such reports from retirement income sources, actual estimated income, etc. The income dashboard shows a user a current year, a retirement year, and a five year view. The income dashboard determines if there will be a surplus or a shortfall of income based on the inputs provided. The special computer platform is designed such that the income dashboard is connected to a retirement plan as changes and updates are made. The income dashboard provides reporting functionality and assembles reports.

The income dashboard is tactical as it is particularly suited for "short-term" retirement planning by a user. "Short-term," as used herein, generally refers to being within 10 years or less of retirement, more particularly within 5 years or less of retirement. The investment income rates use current yields and yield assumptions. The income dashboard is typically used with a user who is retired or within 5 years of retirement. The income dashboard displays estimated income to meet current year goals plus an additional four year estimate.

The income dashboard can show a user what income his/her portfolio is generating and what it may generate in retirement. The income dashboard can help a user explore various strategies and construct a withdrawal strategy that is right for the user. The income dashboard can explain to a user how the income needs of the user can be met during retirement. The income dashboard allows a user to create different scenarios portraying how various portfolio changes may affect the retirement income of the user. The income dashboard can make sure that all assets and liabilities are up to date and accurate. It can also ensure all of the appropriate accounts, including external accounts, are selected for inclusion in the income dashboard. The income dashboard can make sure that income and expenses are up to date and accurate, retirement spending is net of taxes, and check the current versus strategic allocation.

Figure 3:
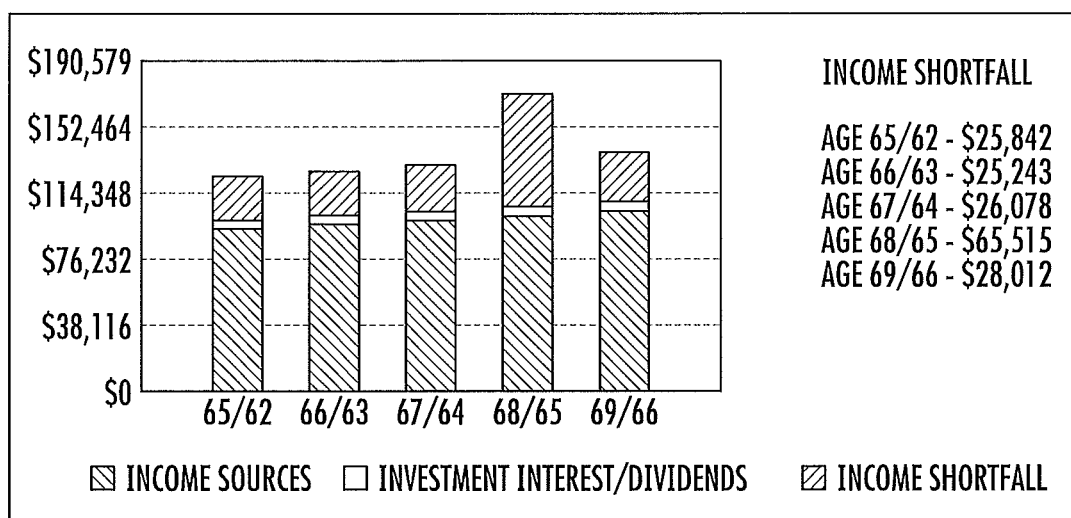
FIG. 3 illustrates a graphical representation of a shortfall, if any, as demonstrated by the income dashboard in accordance with aspects of the present invention.

As a feature of the income dashboard, coverage ratio is measured as surplus divided by shortfall or overage. FIG. 3 illustrates a graphical representation of a shortfall, if any, as demonstrated by the income dashboard in accordance with aspects of the present invention. The income dashboard uses income sources and investment interest and dividends to determine if there will be an income shortfall for a given retirement goal(s). The income dashboard provides a graphical representation such as in the form of a bar graph to show whether or not there is a shortfall. The shortfall can be modified with other available computer software application tools suitable for use with the income dashboard application. Modifications may include, but are not limited to, changes to the strategic allocation, overriding yield assumptions, or by adding an annuity or multiple annuities to a portfolio.

Figure 4A:
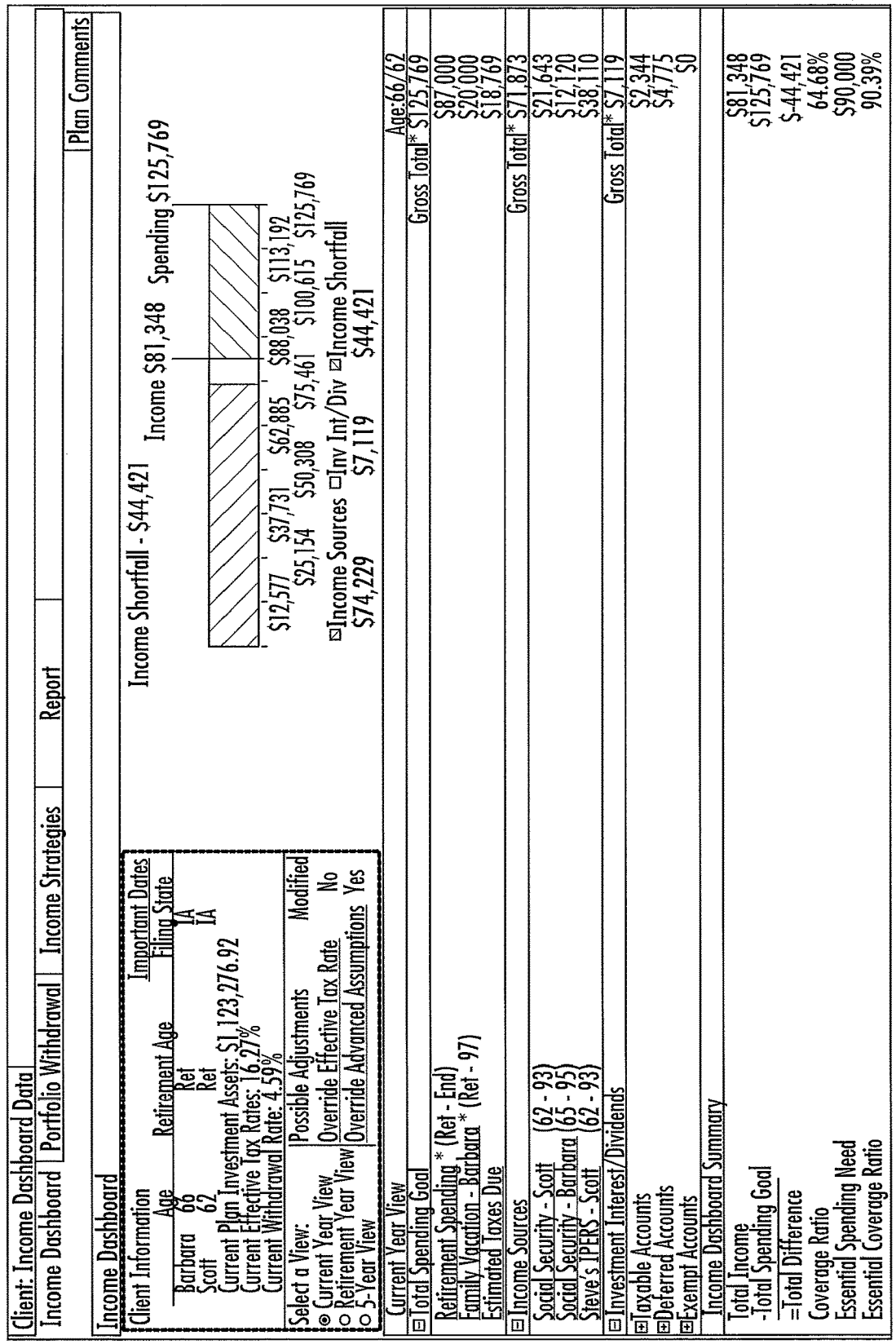
FIG. 4A illustrates a "Client Information" section of the income dashboard.

FIG. 4A illustrates a "Client Information" section of the income dashboard. In the "Client Information" section, client information is displayed with key factors listed for informational purposes. The client information section may include information including, but not limited to, client name(s), age(s), retirement age(s), filing state, current plan investment assets (numerical total), current effective tax rate, and current withdrawal rate. FIG. 4B is an enlarged view of the "Client Information" section of FIG. 4A.

Figure 5A:
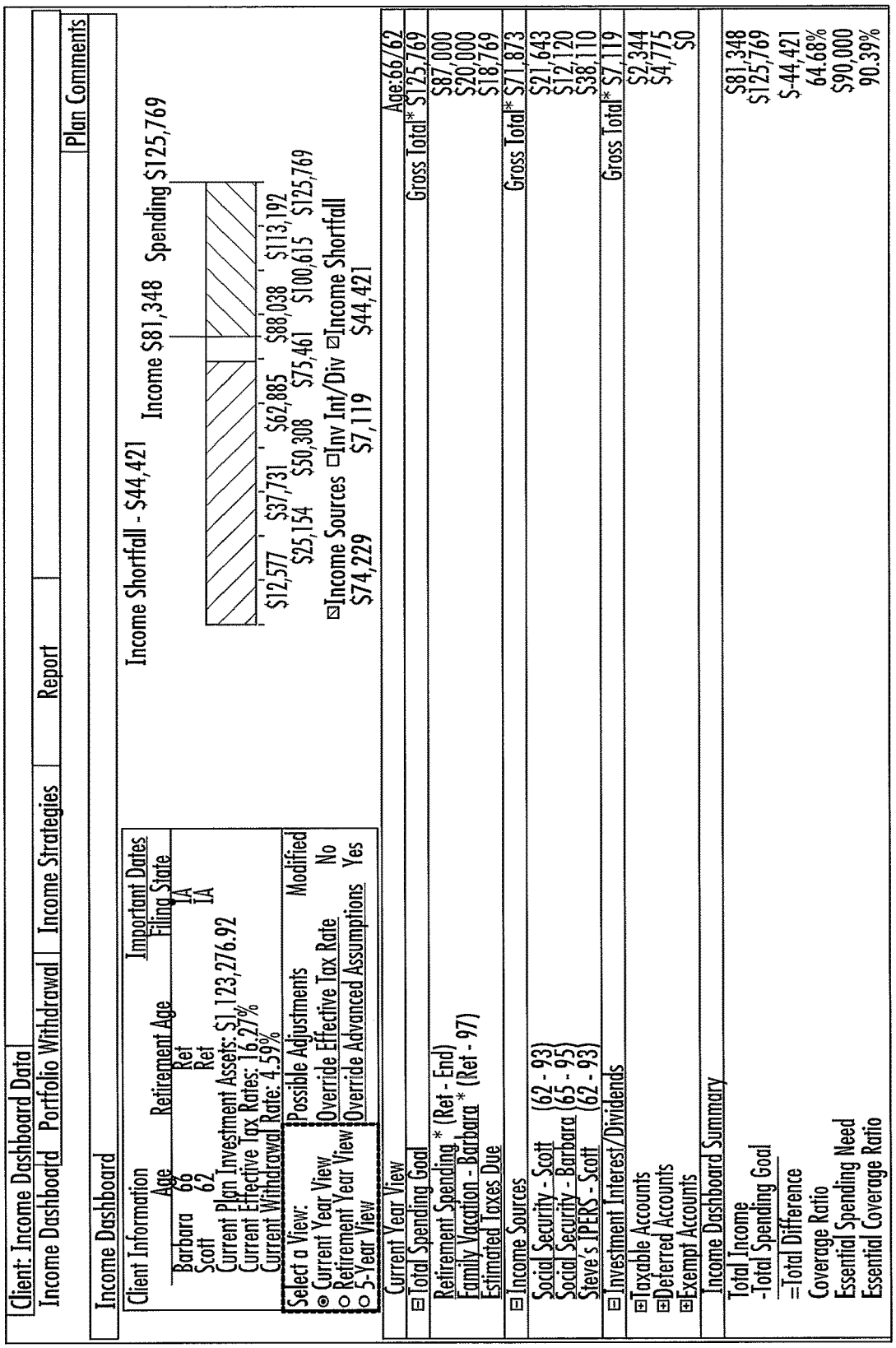
FIG. 5A illustrates a "Select a View" section of the income dashboard.

FIG. 5A illustrates a "Select a View" section of the income dashboard. The section of the income dashboard offers a "Current Year" view, a "Retirement Year" view, and "5-Year" view to display. With regard to the "Current Year" view, as long as the client is retired or within five years of retirement, this view will display the current year of cash flows and coverage ratio based on the provided data. With regard to the "Retirement Year" view, as long as the client is within five years of retirement or in their retirement year, this view will display the cash flows and coverage ratio for the year of retirement only. With regard to the "5-Year" View, as long as the client is retired or within five years of retirement, this view will display cash flows and coverage ratios for the current year plus the following 4 years. FIG. 5B is an enlarged view of the "Select a View" section of FIG. 5A.

Figure 6:
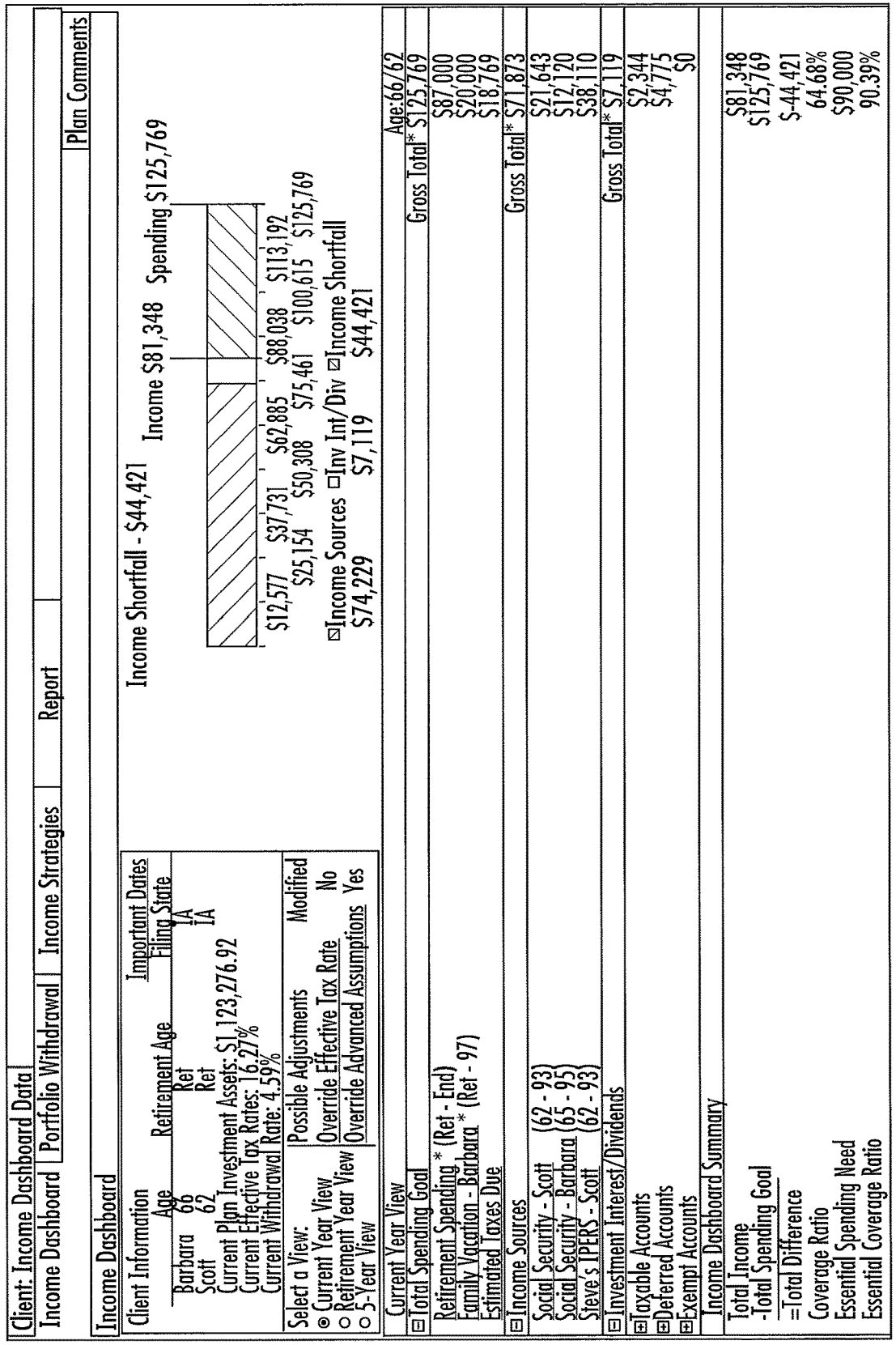
FIG. 6 illustrates a "Current Year" view section of the income dashboard.

FIG. 6 illustrates a "Current Year" view section of the income dashboard.

Figure 7:
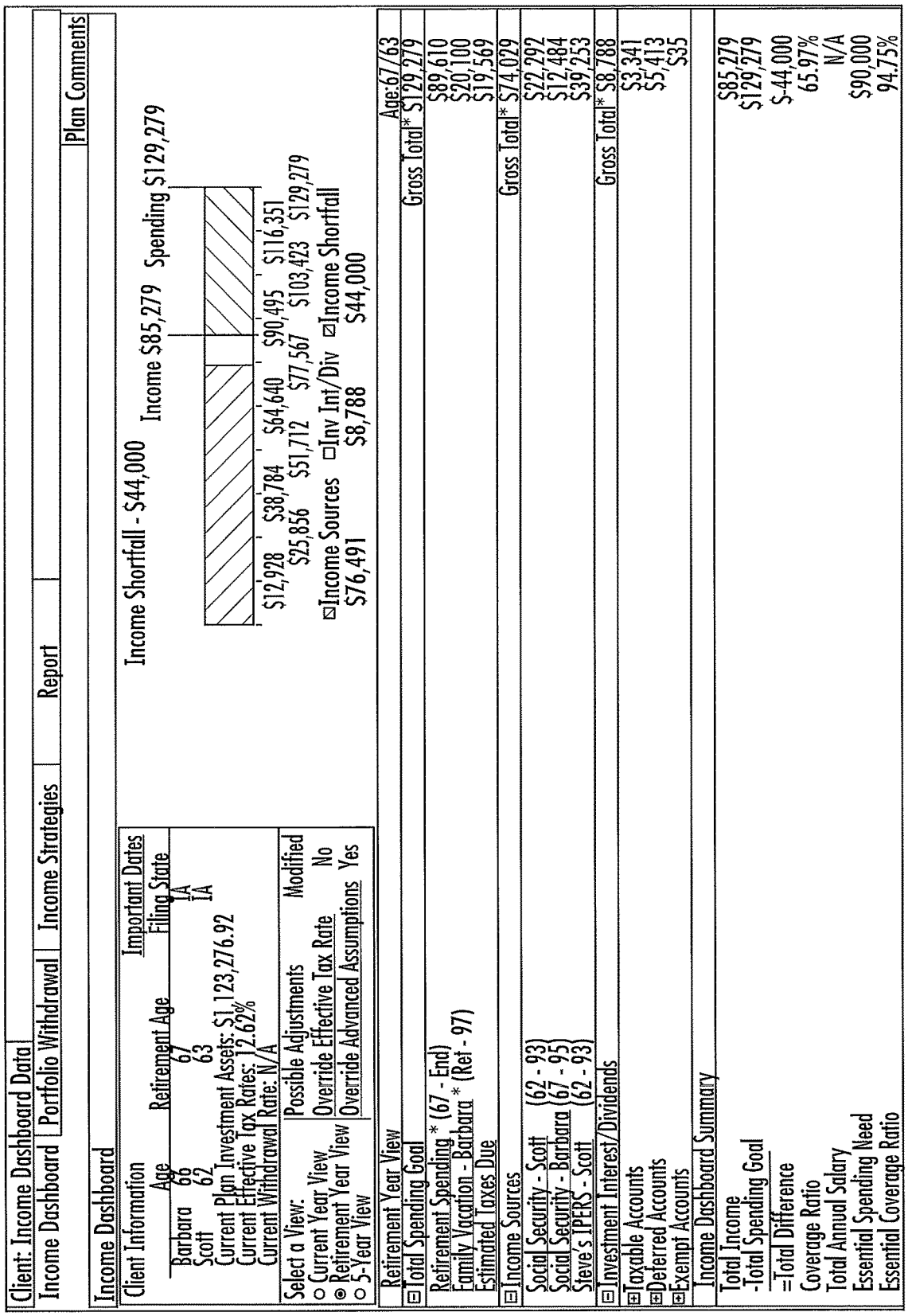
FIG. 7 illustrates a "Retirement Year" view section of the income dashboard.

FIG. 7 illustrates a "Retirement Year" view section of the income dashboard.

Figure 8:
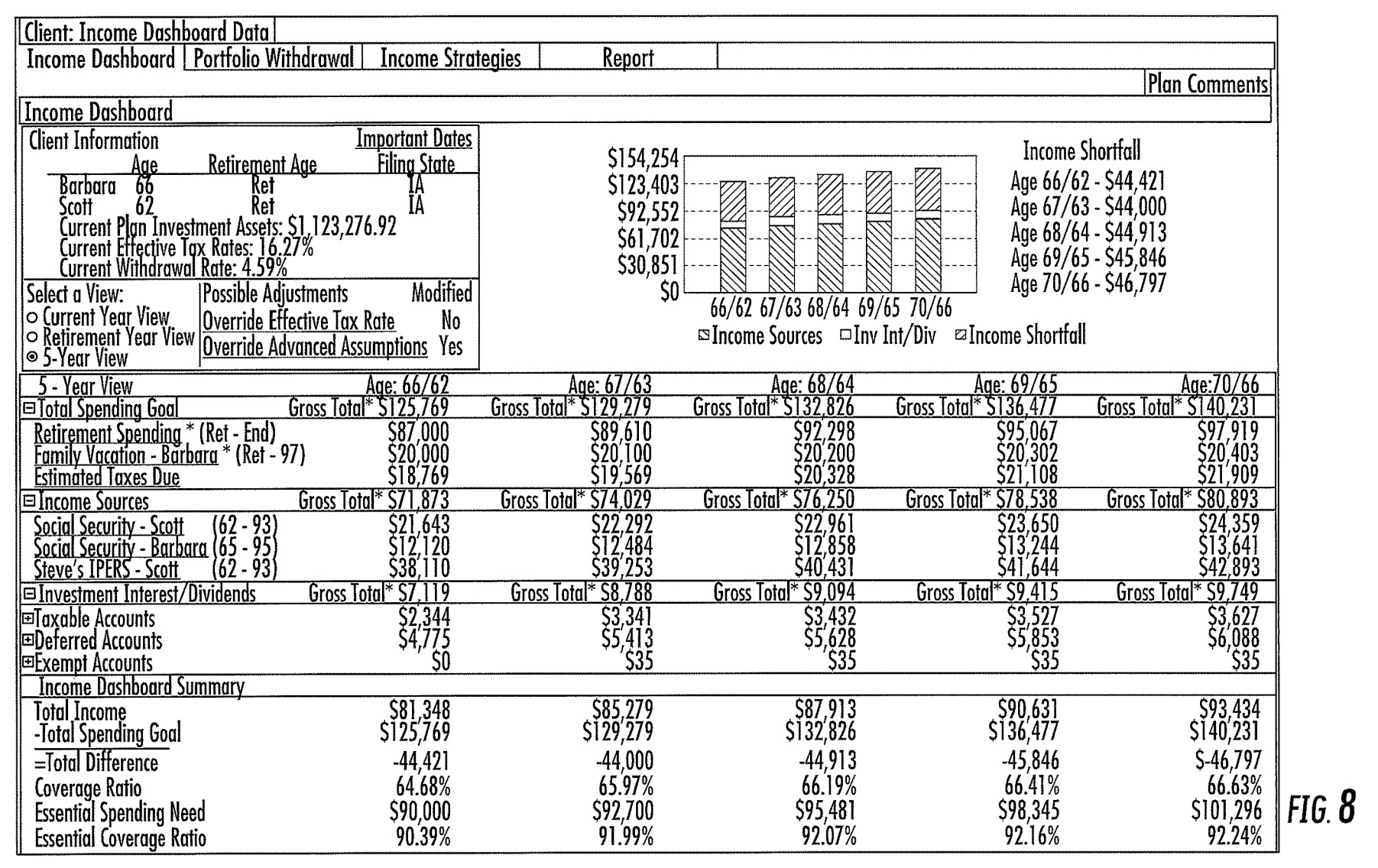

FIG. 8 illustrates a "5-Year" view section of the income dashboard.

Figure 9A:
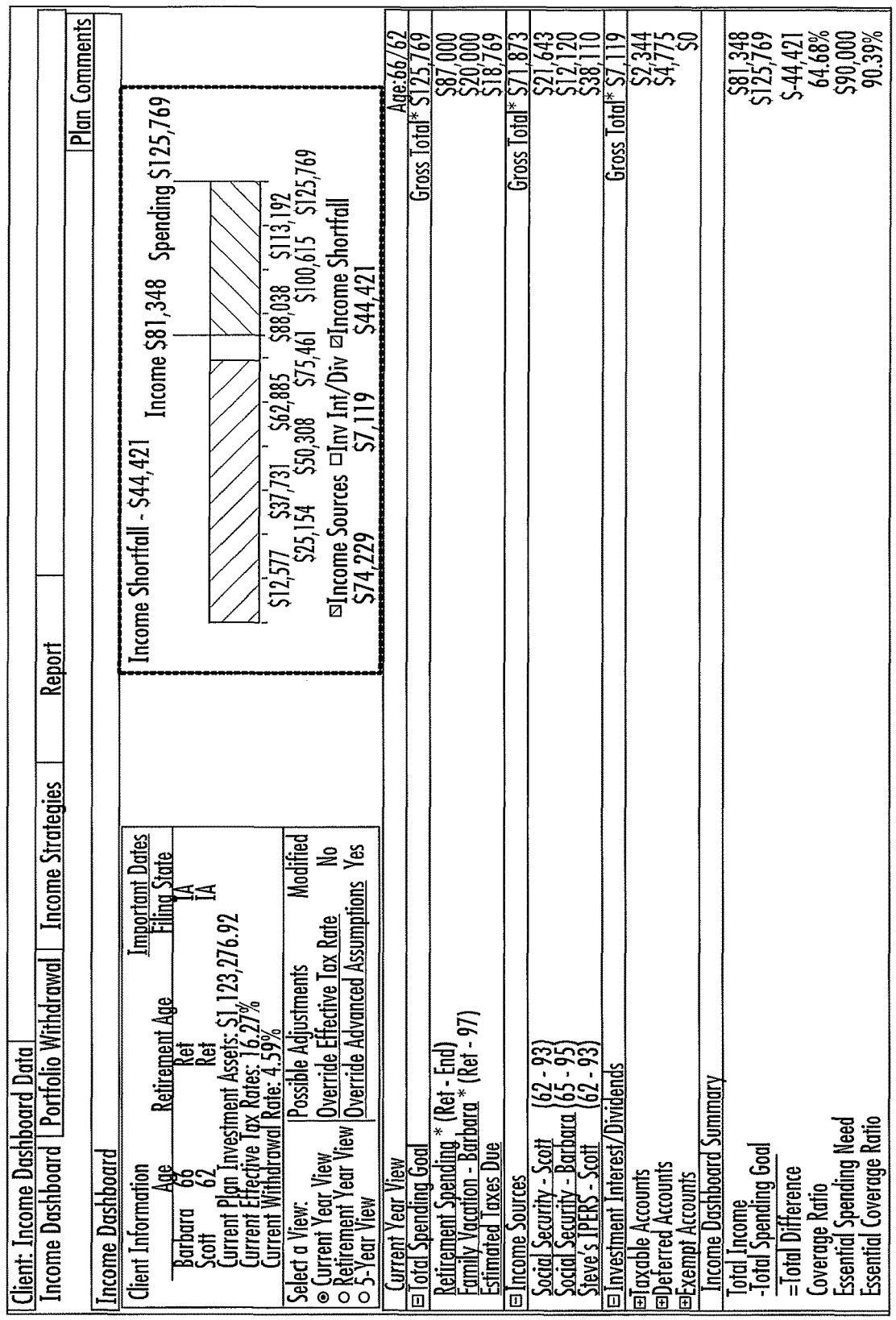
FIG. 9A illustrates a graphical representation of any income surplus or shortfall on the income dashboard.
Figure 9B:
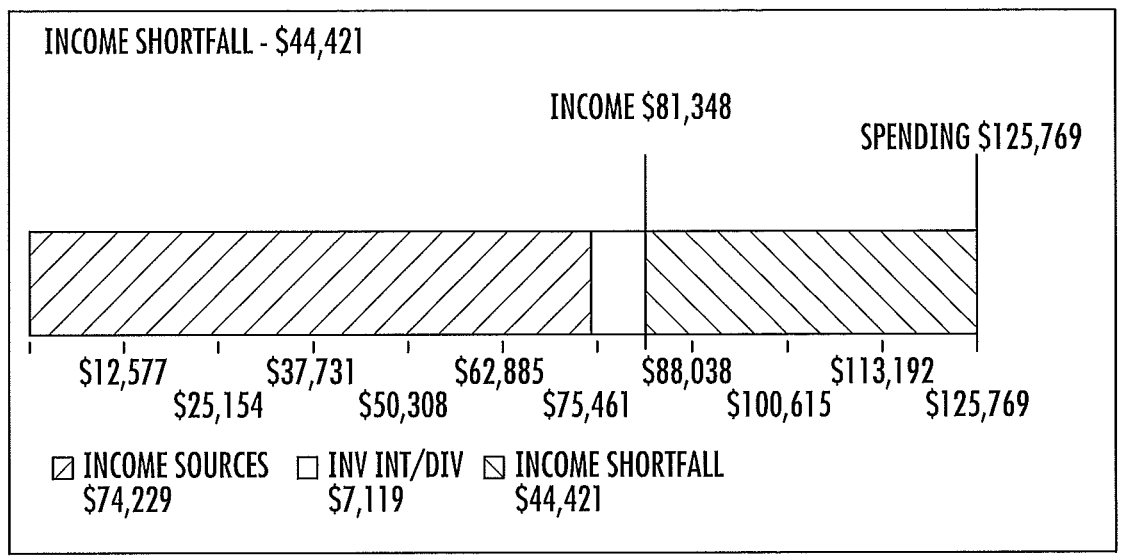
FIG. 9B is an enlarged view of the graphical representation of FIG. 9A.

FIG. 9A illustrates a graphical representation of any income surplus or shortfall on the income dashboard. The graphical representation is in the form of a bar graph. The total bar represents entire spending need. The bar graph comprises income sources and investment income/dividends. This collective income is compared to the spending need. Any gap is designated as an income shortfall. Any excess is designated as an income surplus. FIG. 9B is an enlarged view of the graphical representation of FIG. 9A.

Figure 10A:
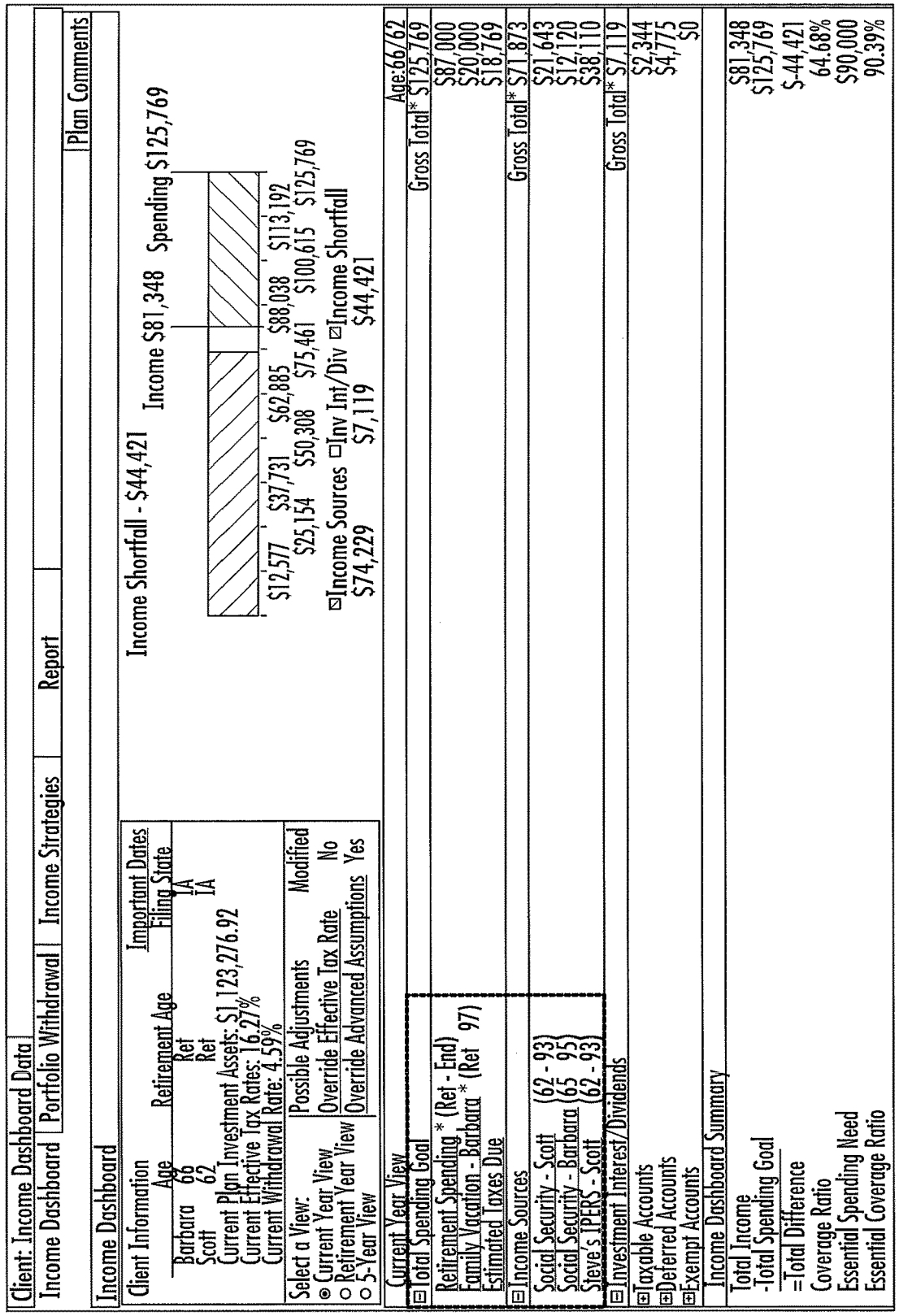
FIG. 10A illustrates a "Total Spending Goal" section and an "income Sources" section on the income dashboard.

FIG. 10A illustrates a "Total Spending Goal" section and an "Income Sources" section on the income dashboard. The total spending goal and income sources are sourced by and, in turn, accessed and/or extracted from a retirement plan using the retirement plan module of the computer platform for purposes of the income dashboard. FIG. 10B is an enlarged view of the section of FIG. 10A.

Figure 11A:
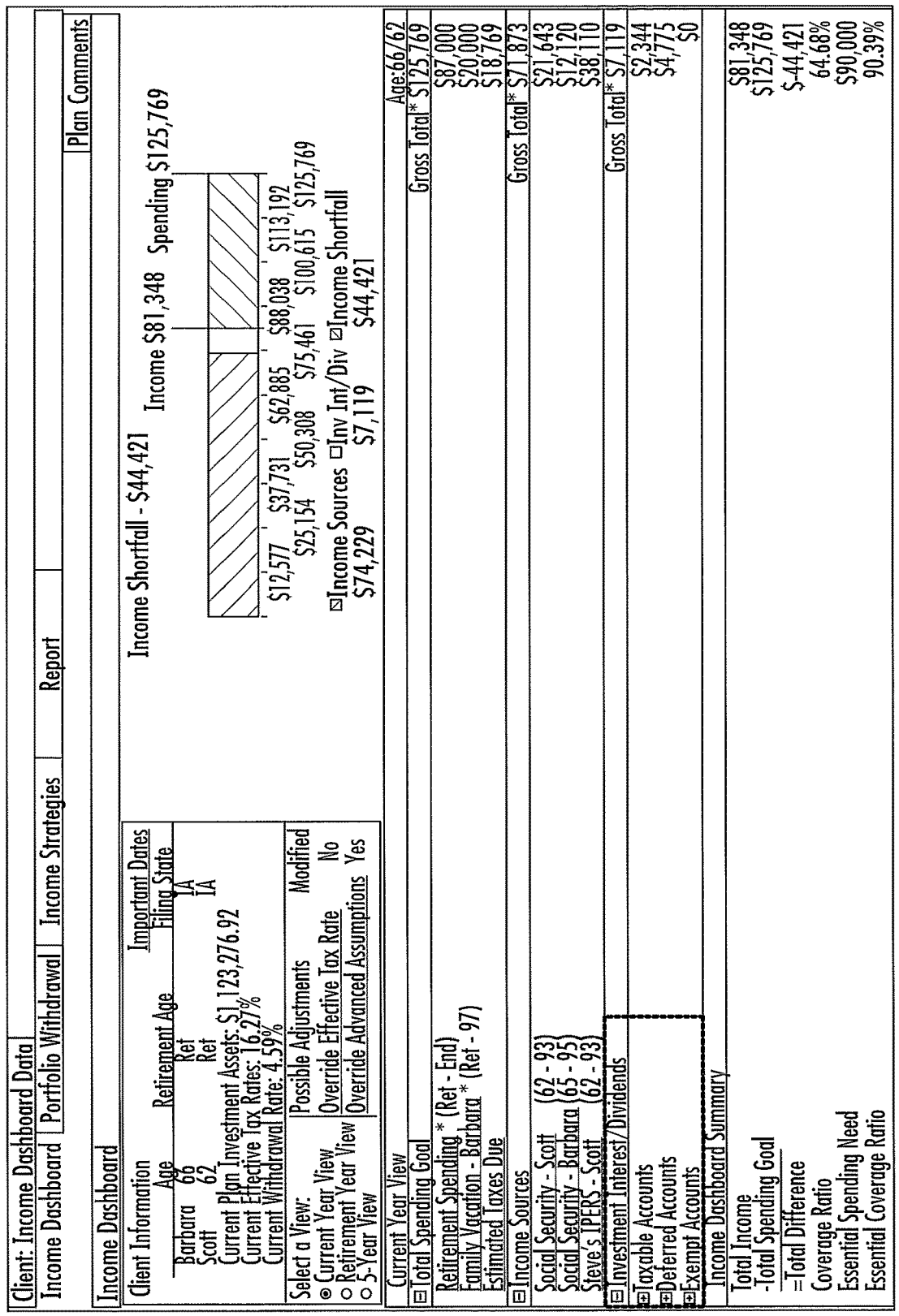
FIG. 11A illustrates an "Investment Interest/Dividends" section that displays taxable and deferred accounts on the income dashboard.
Figure 11B:
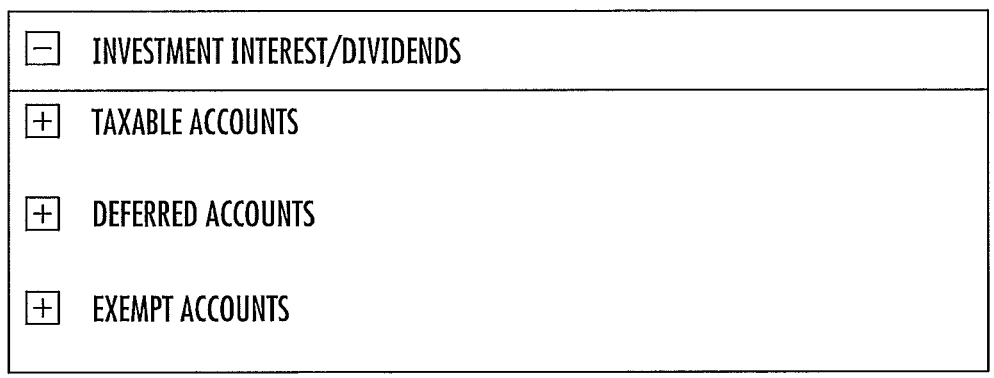
FIG. 11B is an enlarged view of the section of FIG. 11A.

FIG. 11A illustrates an "Investment Interest/Dividends" section that displays taxable and deferred accounts on the income dashboard. This section lists all taxable accounts and any deferred or exempt accounts to be included in the analysis. A user has the ability to expand or to collapse the account income information for different readability or ease of reference. FIG. 11B is an enlarged view of the section of FIG. 11A.

FIG. 12 illustrates a "Taxable Accounts" section of the "Investment Interest/Dividends" section of the income dashboard. As shown, year 1 uses actual yields. Years 2 to 5 use yield assumptions to calculate income.

Figure 13A:
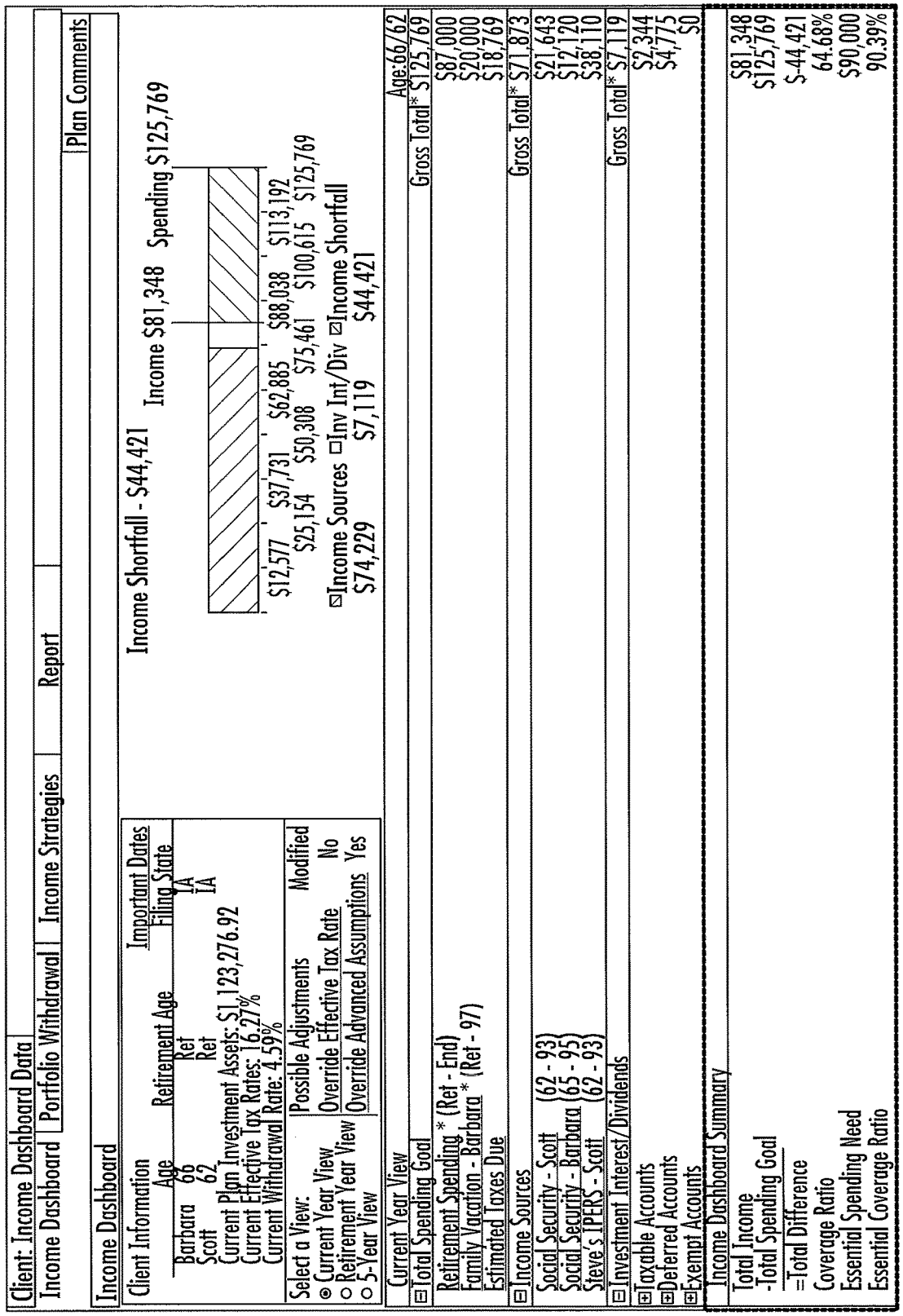
FIG. 13A illustrates an "Income Dashboard Summary" section of the income dashboard.

FIG. 13A illustrates an "Income Dashboard Summary" section of the income dashboard. The income dashboard summary displays total income less the total spending goal to calculate income shortfall or surplus. The income dashboard summary also displays other features such as the coverage ratio, essential spending need, and essential coverage ratio. A 5-Year View has a summary for each year displayed. FIG. 13B is an enlarged view of the "Income Dashboard Summary" of FIG. 13A.

Figure 14A:
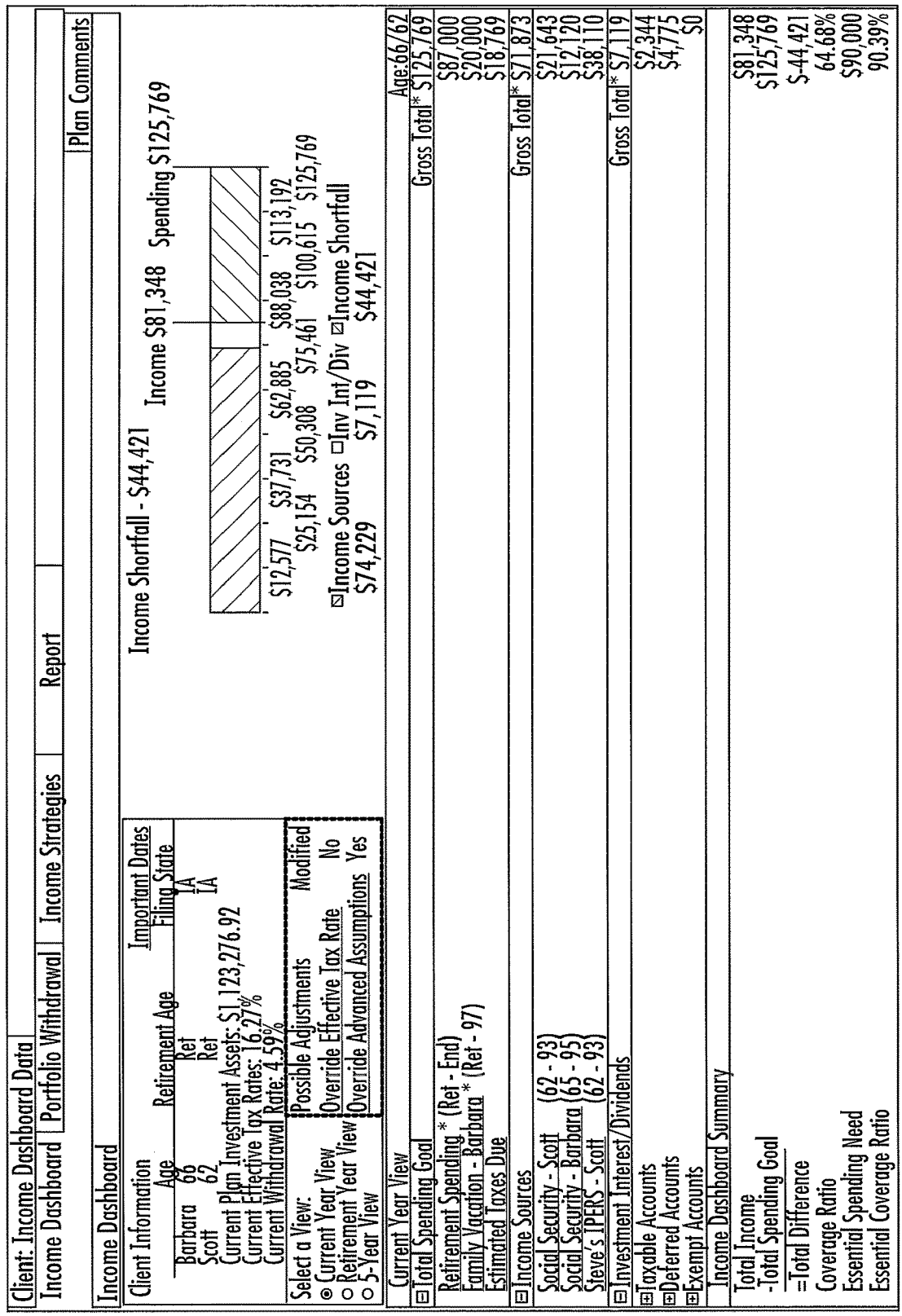
FIG. 14A illustrates a "Possible Adjustments" section of the income dashboard.
Figure 18:
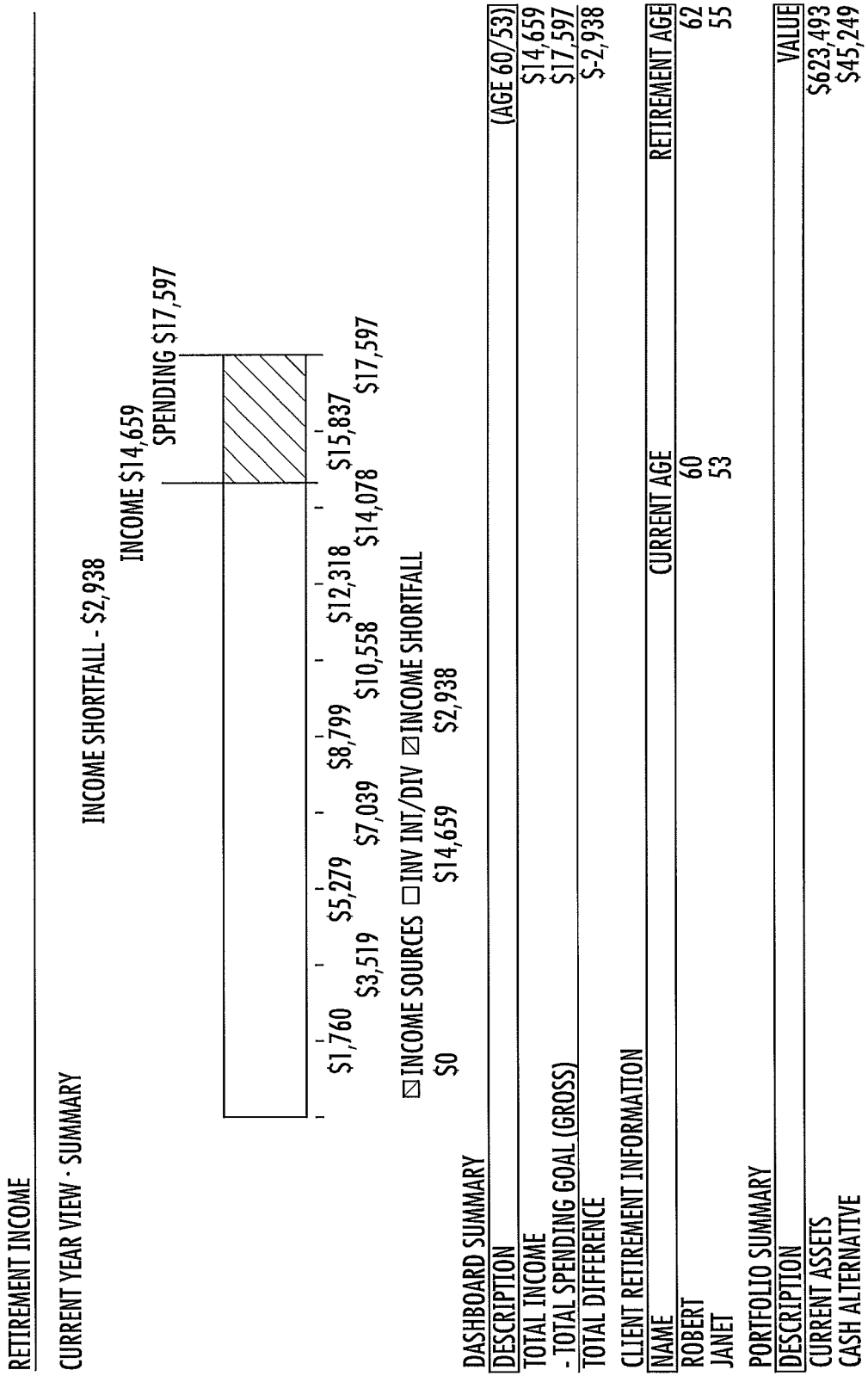
Figure 21:
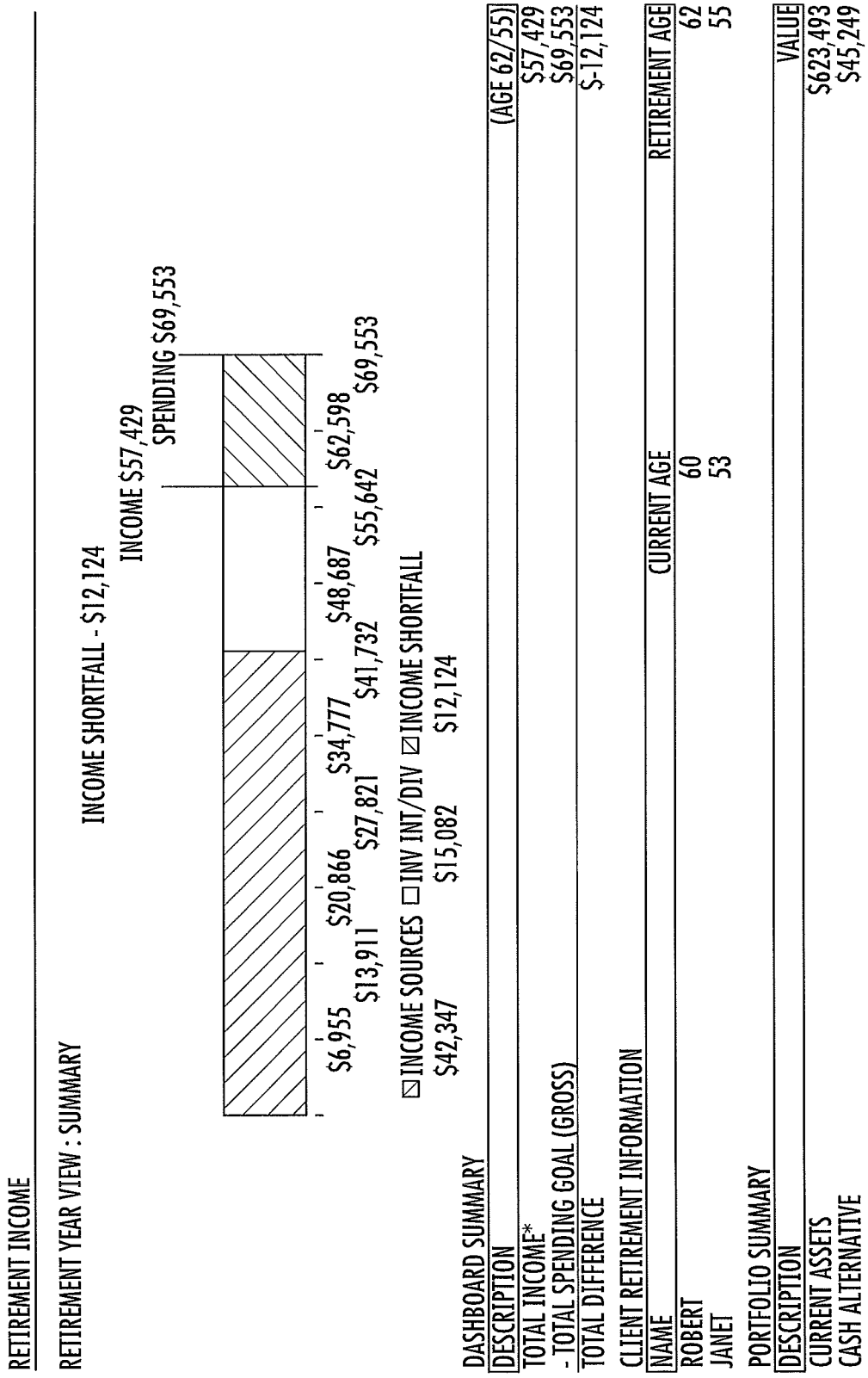
Figure 23:
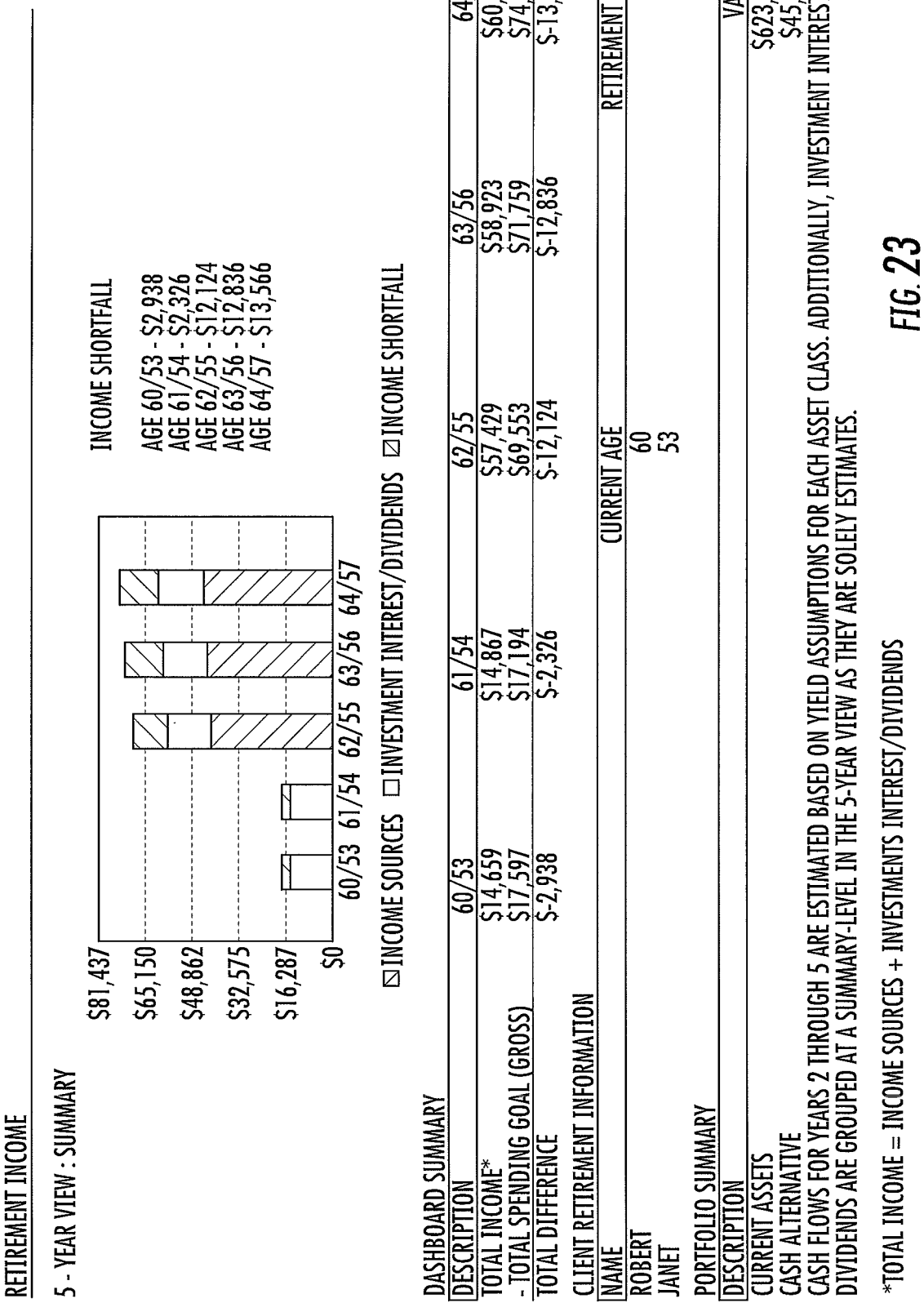

FIG. 14A illustrates a "Possible Adjustments" section of the income dashboard. It is possible for a user to override the effective tax rate and/or to override advanced assumptions with this functionality of the income dashboard. FIG. 14B is an enlarged view of the "Possible Adjustments" section of FIG. 14A.

FIG. 15A illustrates a screenshot of an "Override Advanced Assumptions" section of the income dashboard. The user has the ability to modify various yield values and include or exclude tax deferred and exempt accounts for use within the application. A user clicks a "Use Plan Overrides" button or link to set overrides assumptions for the income dashboard. The column identified as "Current Yield" refers to the yields used in year one of the tool and the column identified as "Default Rate" refers to the yield assumptions used in years 2 to 5 on the 5-Year View of the tool. It is possible for a user to include or exclude any tax deferred or exempt accounts by selecting the check box next to the account or by choosing "Select All." For example, by default, if a client is 70½ or younger, deferred and exempt accounts may not be checked to be included in the analysis by the income dashboard. However, if the client is over 70½ the system may automatically include all deferred accounts to be included in the analysis. Once the user is done with making a modification to the "Override Advanced Assumptions" screen, the user selects "OK" to save and use in the analysis. FIG. 15B illustrates a "Tax Deferred Accounts-Income Selections" section for tax deferred accounts and a "Tax Exempt Accounts-Income Selections" section for tax exempt accounts of the income dashboard. FIG. 15C illustrates an "Essential Spending Illustration" section of the income dashboard.

FIG. 16 illustrates an "Override Effective Tax Rate" section of the income dashboard. The present invention includes methodology on calculating an estimated tax amount and rate. A user has the ability to modify tax rates used within the income dashboard application. The default rate assumptions look at the actual positions in year 1 to apply taxes instead of using the assumptions. To activate the override columns, a user clicks the button or icon to the left of the field and enters a designated tax rate. Once a user has completed entering any of the tax rate overrides, the user may click "Save Changes" button or icon to apply to the analysis.

FIGS. 17-24 illustrate a sample report generated by the computer system of the present invention using the income dashboard.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for use in a retirement computer system, the method comprising:
   providing a computer platform comprised of a first computer or server having a retirement plan module comprising retirement data and a processor, the first computer or server communicatively connected to a second computer or server, and the second computer or server having an interactive user interface application for short-term retirement planning and a computer software application tool for use with the user interface application,
   generating by the computer platform a short-term income projection for an investment or retirement portfolio associated with a retirement spending need,
   displaying on a display screen of a computer-based device that is in communication with the user interface application a number of interactive areas configured to be modified by a user and to provide a dynamic view of a current financial situation of the user based on the short-term income projection and user modifications,
   detecting by the computer platform an indication of resizing for improved readability, and
   automatically resizing at least one of the number of interactive areas on the display screen upon detection of the indication to improve readability of the at least one of the number of interactive areas.

2. The method according to claim 1, further comprising sourcing by the retirement plan module retirement plan data to the user interface application.

3. The method according to claim 1, further comprising presenting a side-by-side view comprised of the current financial situation versus a proposed future action of a user.

4. The method according to claim 1, further comprising determining by the computer platform an impact of a short term tactical move on a future condition.

5. The method according to claim 1, further comprising displaying on a computer-based device that is in communication with the user interface application at least one feature selected from the group comprising: currency support, optimal dividend stock pick, or estimated value of savings.

6. The method according to claim 1, further comprising receiving by the computer platform an input of at least one retirement goal of a user.

7. The method according to claim 1, further comprising measuring by the computer platform an ability of the user to fund the at least one retirement goal based upon actual income that an investment or retirement is generating.

8. The method according to claim 7, further comprising incorporating by the computer platform known investments and assets held.

9. The method according to claim 1, further comprising determining by the interactive user interface application any surplus or any shortfall of income based on provided inputs.

10. The method according to claim 1, further comprising connecting by the computer platform the interactive user interface application to a retirement plan as any updates are made.

11. The method according to claim 1, further comprising presenting by the interactive user interface application estimated income to meet a current year goal plus an additional multi-year year estimate.

12. The method according to claim 1, further comprising selecting an internal account, an external account, or a combination thereof for inclusion in the interactive user interface application.

13. The method according to claim 1, further comprising measuring by the computer platform a coverage ratio as a surplus divided by a shortfall or an overage.

14. The method according to claim 1, further comprising determining by the interactive user interface application any income shortfall for a retirement goal.

15. The method according to claim 1, further comprising extracting a total spending goal and any income sources from a retirement plan by the retirement plan module of the computer platform.

16. The method according to claim 1, further comprising displaying by the interactive user interface application total income less total spending goal of a user to calculate any income shortfall or income surplus.

* * * * *